United States Patent [19]

Stelter, III

[11] Patent Number: 4,735,424
[45] Date of Patent: Apr. 5, 1988

[54] UTILITY HAND CART

[76] Inventor: Richard G. Stelter, III, 3930 Holder Forest Dr., Houston, Tex. 77088

[21] Appl. No.: 888,690

[22] Filed: Jul. 24, 1986

[51] Int. Cl.$^4$ .............................................. B62B 1/04
[52] U.S. Cl. ............................... 280/43.1; 280/43.11; 280/47.21; 280/47.23; 280/47.24; 414/444; 414/490
[58] Field of Search .............. 280/47.21, 47.22, 47.23, 280/47.24, 47.29, 43.1, 43.11; 298/2, 3; 414/444, 445, 457, 490

[56] References Cited

U.S. PATENT DOCUMENTS

| | | | |
|---|---|---|---|
| 408,568 | 8/1889 | Amos | 280/43.1 |
| 673,690 | 5/1901 | Schoelch | 280/47.29 |
| 1,161,256 | 11/1915 | Schroeder | 280/47.23 |
| 1,227,875 | 5/1917 | Brickel | 280/47.21 |
| 2,261,520 | 11/1941 | Knudtson | 280/47.23 |
| 2,880,431 | 4/1959 | Noland | 280/43.1 |
| 4,653,765 | 3/1987 | Smalley et al. | 280/47.21 |

FOREIGN PATENT DOCUMENTS

| | | | |
|---|---|---|---|
| 275772 | 6/1915 | Fed. Rep. of Germany | 280/47.29 |
| 81598 | 4/1953 | Norway | 280/47.21 |
| 299557 | 10/1927 | United Kingdom | 280/47.23 |

*Primary Examiner*—John J. Love
*Assistant Examiner*—Eric Culbreth
*Attorney, Agent, or Firm*—Kenneth A. Roddy

[57] ABSTRACT

A utility hand cart is disclosed which is particularly suited for use in lifting and transporting bulky heavy objects, such as automobile transmissions, air conditioner compressors, etc. The cart comprises a lower U-shaped rectangular frame and an elongated inverted U-shaped handle having its lower open ends pivotally attached to each side of the lower frame. Wheels are rotatably mounted on a bracket beneath each side of the handle and move therewith to engage the lower frame member. In use, the cart is wheeled into position and the handle is raised to pivot the front end of the lower frame about the wheel axis to contact the floor surface and the front of the lower frame is slid beneath the object to be lifted. When properly positioned, the handle is raised further causing the wheel to pivot upwardly relative to the lower frame until the lower frame is resting horizontally on the floor. When the handle is released, a spring returns the handle to the lower position and the wheel axle engages the lower frame. To lift the object, the handle is pushed down and the object is lifted and transported to another location. After transporting the object, the handle is again lifted moving the lower frame to the floor, gently placing the lifted object on the floor surface.

13 Claims, 1 Drawing Sheet

U.S. Patent
Apr. 5, 1988
4,735,424
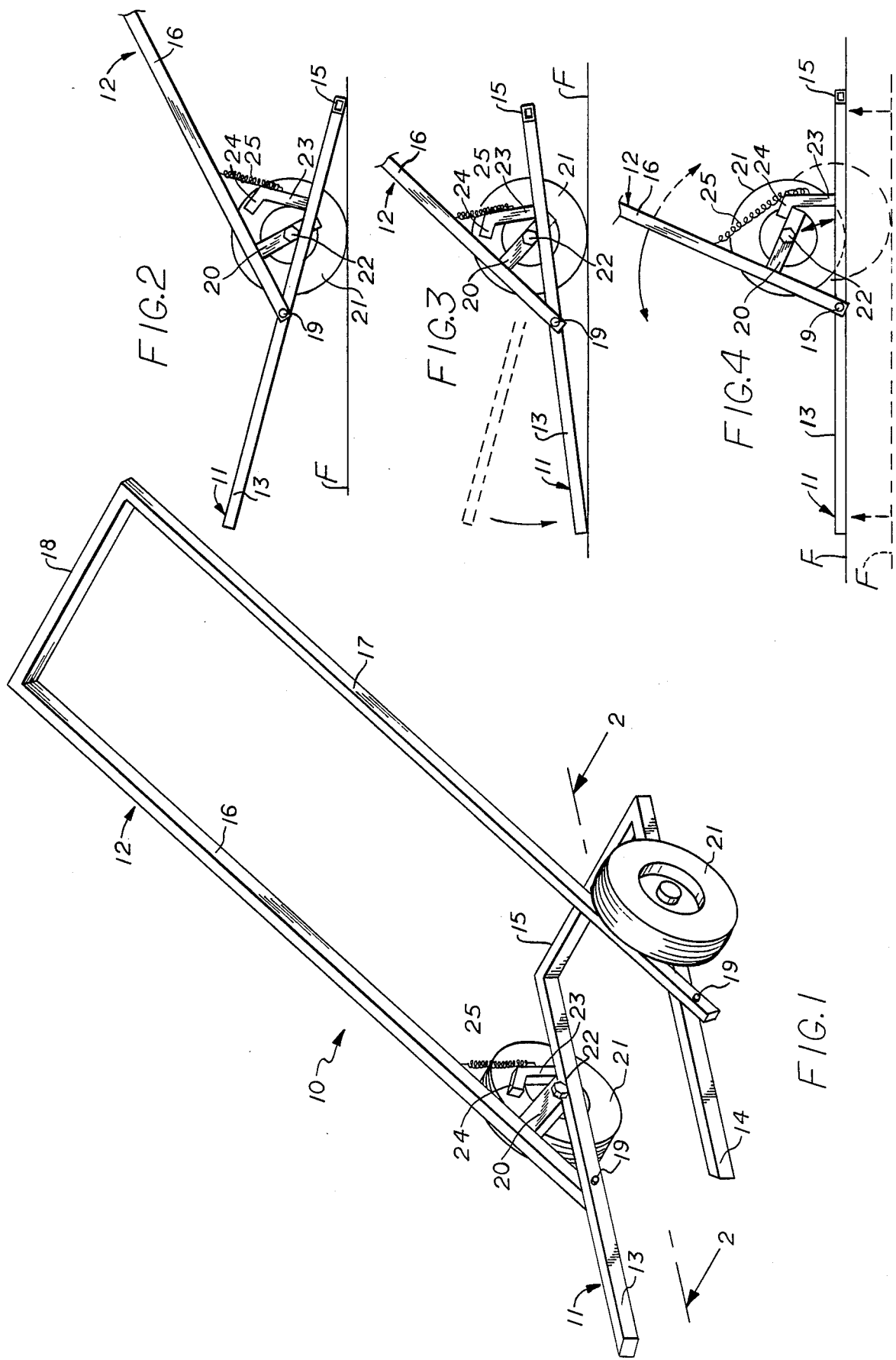

UTILITY HAND CART

BACKGROUND OF THE INVENTION

1. Field of the Invention

This invention relates generally to hand trucks and carts, and more particularly to a utility hand cart which will pivot as a whole about the wheel axle when the handle is raised and when the front of the lower frame contacts the floor, the handle will pivot relative to the lower frame.

2. Brief Description of the Prior Art

Lifting and transporting bulky heavy objects, such as automobile transmissions, air conditioner compressors, etc., usually requires two or more people. Often, a conventional dolly or wheeled floor jack is used. One end or corner of the object is lifted by one or two people while another person slides the leading edge of the dolly or jack under the object. The dolly or jack is raised and while one person pulls or pushes the load, the others must hold onto the object while it is being transported to prevent the load from shifting or falling off the dolly or jack.

Hand trucks and carts having wheels movable relative to the cart frame are known in the art. There are several patents which disclose various hand trucks and carts which have movably mounted wheels, none of which have a lower frame member which is horizontally movable relative to the surface of the floor.

Amos, U.S. Pat. No. 408,568 discloses a stove truck having a pair of handles with a frame rigidly attached thereto. The frame carries pivoted supporting-legs and rollers. The rollers are connected to a lever pivoted between the handles for elevating and lowering the frame.

Schroeder, U.S. Pat. No. 1,161,256 discloses a drop frame cart having a generally L-shaped weight bearing member suspended from the axle member. The weight bearing member assumes a level position when the frame is moved pivoted relative to the axle.

Brickel, U.S. Pat. No. 1,227,875 discloses a truck having wheels attached to the frame by a series of pivotal link members. The engaging lip of the truck is inserted beneath the object to be lifted and the handle portion of the truck is tilted rearwardly with the engaging lip as a fulcrum. After the truck has been tilted rearwardly to support the object in a reclining position, the entire frame may be tilted backward on the axle and supported on by the wheels.

Knudtson, U.S. Pat. No. 2,261,520 discloses a hand truck having a bottom and upstanding side walls. Wheels are carried in an inverted T-shaped bracket attached to the side walls. A U-shaped prop member is attached to the handle by a compression spring and controlled by a hand lever to swing into a lowered position to maintain the truck bottom in an inclined position while objects are slid from the floor onto the truck bottom.

Noland, U.S. Pat. No. 2,880,431 discloses a wheeled loading dock plate having a platform with a pair of handles pivotally mounted at the sides. Wheels are pivotally mounted on the handles such that they will collapse flat to the floor when the plate is in the proper position and the handles are lowered. The wheels may be moved into supporting position by the handles when moving the dock plate.

The present invention is distinguished over the prior art in general, and these patents in particular by a utility hand cart comprising a lower U-shaped rectangular frame and an elongated inverted U-shaped handle having its lower open ends pivotally attached to each side of the lower frame. Wheels are rotatably mounted on a bracket beneath each side of the handle and move therewith to engage the lower frame member. The handle may be raised to pivot the front end of the lower frame about the wheel axis to contact the floor surface allowing the front of the lower frame to be slid beneath the object to be lifted. Further raising of the handle causes the wheels to pivot upwardly relative to the lower frame until the lower frame is resting horizontally on the floor. When the handle is released, a spring returns the handle to the lower position and the wheel axle engages the lower frame. To lift the object, the handle is pushed down and the object is lifted and transported to another location. After transporting the object, the handle is again lifted moving the lower frame to the floor, gently placing the lifted object on the floor surface.

SUMMARY OF THE INVENTION

It is therefore an object of the present invention to provide a utility cart which is particularly suited for use in lifting and transporting bulky heavy objects, such as automobile transmissions, air conditioner compressors, etc.

It is another object of this invention to provide a utility cart having a lower frame which may be lowered horizontal to a floor surface for easily and safely placing the cart beneath object to be lifted, lifting and transporting the object, and placing it back on the floor surface.

Another object of this invention is to provide a utility cart which will allow a single person to safely and easily lift and transport heavy objects thereby reducing labor costs and manpower.

A further object of this invention is to provide a utility cart which is simple in construction, economical to manufacture and rugged and durable in use.

Other objects of the invention will become apparent from time to time throughout the specification and claims as hereinafter related.

The above noted objects and other objects of the invention are accomplished by the present utility hand cart which has a lower U-shaped rectangular frame of and an elongated inverted U-shaped handle having its lower open ends pivotally attached to each side of the lower frame. Wheels are rotatably mounted on a bracket beneath each side of the handle and move therewith to engage the lower frame member.

BRIEF DESCRIPTION OF THE DRAWINGS

FIG. 1 is an isometric view of a preferred utility cart in accordance with the present invention.

FIG. 2 is a side elevation view in cross section of the lower portion of the utility cart of FIG. 1, taken along lines 2—2 and showing the cart in the stored position.

FIG. 3 is a side elevation view in cross section of the lower portion of the utility cart of FIG. 1 showing the cart in position prior to being placed beneath the object to be lifted.

FIG. 4 is a side elevation view in cross section of the lower portion of the utility cart of FIG. 1 showing the cart with the lower frame portion resting horizontally on the floor ready for lifting an object.

DESCRIPTION OF THE PREFERRED EMBODIMENT

Referring to the drawings by numerals of reference, there is shown in FIG. 1, a preferred utility hand cart 10 which is particularly suited for use in lifting and transporting bulky heavy objects, such as automobile transmissions, air conditioner compressors, etc.

The cart 10 comprises a generally U-shaped rectangular lower frame 11 of square tubing and an elongated U-shaped handle 12, also of square tubing. The lower frame 11 has a pair of parallel side members 13 and 14 and a rear cross member 15 extending therebetween. In the embodiment illustrated, the lower frame 11 has an open front end.

The handle 12 has a pair of parallel side members 16 and 17 and an upper cross member 18 extending therebetween. The lower end of the side members 16 and 17 are pivotally attached to each side of the lower frame 11 by conventional means such as bolts as indicated at 19.

Wheel brackets 20 are secured to the bottom of each side member 16 and 17 to depend perpendicular thereto. A wheel 21 is rotatably mounted on each bracket 20 by axle bolts 22 which extend through holes (not shown) in the lower end of the wheel brackets. The head of the axle bolts 22 are located inward and above the top surface of the lower frame side members 13 and 14 for engagement therewith (explained hereinafter).

An inverted generally L-shaped stop bracket 23 is secured on one side member (13) of the lower frame 11 and extends upwardly therefrom to terminate in the bent leg portion 24. A spring 25 is secured at one end to the stop bracket 23 and at the other end to one side member (16) of the handle 12. The spring 25 normally maintains the axle bolt head 22 engaged in contact with the top surface of the side member 13.

It should be understood from the foregoing description, that the cart as a whole will pivot about the wheel axle when the handle is raised and when the front of the lower frame contacts the floor, the handle will pivot relative to the lower frame about the pivot point formed at the bolt connection 19.

OPERATION

Referring now to FIGS. 1-4, FIG. 2 shows the cart in the stored position with the rear cross member 15 of the lower frame 11 resting on the floor F. The cart is wheeled into position adjacent the object to be lifted and the handle 12 is raised to pivot the cart as a whole about the wheel axis, placing the front end of the lower frame on the floor surface (FIG. 3). When properly positioned, the handle is raised further (FIG. 4), pivoting relative to the lower frame about the pivot point formed at the bolt connection 19. This allows the wheel to move upward relative to the lower frame until the wheel bracket 20 is stopped by the bent leg portion 24 of the stop bracket 23. In this position, the lower frame is resting horizontally on the floor. The front of the lower frame may then be slid beneath the object to be lifted.

When the handle 12 is released or pulled down to lift the object, the spring 25 returns the handle to the lower position and the axle nut is again resting on the lower frame (FIGS. 2 and 3). To lift the object, the handle is pushed down and the object is lifted and transported to another location. If the weight is generally balanced on the lower frame, the lower frame will move upwardly parallel to the floor surface until the wheel axle bolts engage the lower frame side members. The parallel raising is illustrated by dotted line in FIG. 4.

To place the object, the handle is raised moving the wheel upward which will move the lower frame parallel to the floor, gently placing the lifted object on the floor surface.

While this invention has been described fully and completely with special emphasis upon a preferred embodiment, it should be understood that within the scope of the appended claims the invention may be practiced otherwise than as specifically described herein.

I claim:

1. A utility hand cart for lifting and transporting objects comprising;
   a generally rectangular lower frame member for receiving objects to be lifted and transported,
   an elongated handle member having two parallel spaced side members at one end pivotally connected to each side of said lower frame intermediate the front and back ends thereof and the opposite end extending angularly upward therefrom to be grasped by the hands of the user,
   wheels rotatably mounted one on each side member of said handle member to move therewith about the pivotal connection as said handle is pivotally raised and lowered,
   contact means extending inwardly from each side member of said handle member in axial alignment with the wheel axis of rotation and above the top surface of said lower frame member to rest thereon, and
   tension means operatively connected between said lower frame member and said handle member to urge said contact means against said lower frame member with sufficient force to maintain contact and cause said lower frame member and said handle member to pivot as a unit about the wheel axis when said handle member is raised and said lower frame is bearing no weight, and
   said contact means breaking contact with said lower frame member to allow relative pivotal between said handle member and said lower frame member about their pivotal connection upon pivoting said handle to a height sufficient to cause the front end of said lower frame member to contact the floor surface supporting said wheels or upon the lower frame member bearing the weight of objects received thereon sufficient to overcome the force of said tension means.

2. A utility hand cart according to claim 1 in which said tension means comprises a spring having one end connected to said lower frame member and the opposed end connected to said handle member.

3. A utility hand cart according to claim 1 in which said lower frame member is movable relative to said handle member and connected together by said tension means in a manner such that an object centrally supported on said lower frame member will be lifted upwardly parallel to the floor surface supporting said wheels when said handle member is pivoted downward about the wheel axis.

4. A utility hand cart according to claim 1 in which said lower frame member comprises a generally U-shaped rectangular frame of square tubing.

5. A utility hand cart according to claim 1 in which said handle member comprises an inverted generally U-shaped rectangular frame of square tubing.

6. A utility hand cart according to claim 1 in which said wheels are rotatably mounted on wheel brackets depending from said handle member by axle bolts, the heads of said bolts defining said contact means located inward and above the top surface of said lower frame member to rest thereon whereby said cart will pivot as a unit about the wheel axis when the heads of said bolts are urged into contact with the top surface of said lower frame member by said tension means.

7. A utility hand cart according to claim 1 including stop means on said lower frame member for limiting the amount of upward pivotal movement of said handle member relative to said lower frame member.

8. A utility hand cart according to claim 7 in which said stop means comprises a bracket having one end secured to one side of said lower frame member and its other end extending upwardly therefrom and the upwardly extended end adapted to stop upward pivotal movement of said handle member relative to said lower frame member at a predetermined distance.

9. A utility hand cart for lifting and transporting objects comprising;
 a generally rectangular lower frame member for receiving objects to be lifted and transported,
 an elongated handle member having two parallel spaced side members at one end pivotally connected to each side of said lower frame intermediate the front and back ends thereof and the opposite end extending angularly upward therefrom to be grasped by the hands of the user,
 wheels rotatably mounted one on each side member of said handle member to move therewith about the pivotal connection as said handle is pivotally raised and lowered,
 contact means extending inwardly from each side member of said handle member in axial alignment with the wheel axis of rotation and above the top surface of said lower frame member to rest thereon,
 spring means operatively connected between said lower frame member and said handle member to urge said contact means against said lower frame member with sufficient force to maintain contact and cause said handle member and said lower frame member to pivot as a unit about the wheel axis when said handle member is raised and said lower frame is bearing no weight,
 said contact means breaking contact with said lower frame member to allow relative pivotal between said handle member and said lower frame member about their pivotal connection upon pivoting said handle to a height sufficient to cause the front end of said lower frame member to contact the floor surface supporting said wheels or upon the lower frame member bearing the weight of objects received thereon sufficient to overcome the force of said spring means,
 said lower frame member movable relative to said handle member and connected together by said spring means in a manner such that an object centrally supported on said lower frame member will be lifted upwardly parallel to the floor surface supporting said wheels when said handle member is pivoted downward about the wheel axis, and
 stop means on said lower frame member for limiting the amount of upward pivotal movement of said handle member relative to said lower frame member.

10. A utility hand cart according to claim 9 in which said lower frame member comprises a generally U-shaped rectangular frame of square tubing.

11. A utility hand cart according to claim 9 in which said handle member comprises an inverted generally U-shaped rectangular frame of square tubing.

12. A utility hand cart according to claim 5 in which said wheels are rotatably mounted on wheel brackets depending from said handle member by axle bolts, the heads of said bolts defining said contact means located inward and above the top surface of said lower frame member to rest thereon whereby said cart will pivot as a unit about the wheel axis when the heads of said bolts are urged into contact with the top surface of said lower frame member by said tension means.

13. A utility hand cart according to claim 9 in which said stop means comprises a bracket having one end secured to one side of said lower frame member and its other end extending upwardly therefrom and the upwardly extended end adapted to stop upward pivotal movement of said handle member relative to said lower frame member at a predetermined distance.

* * * * *